United States Patent Office 2,753,231
Patented July 3, 1956

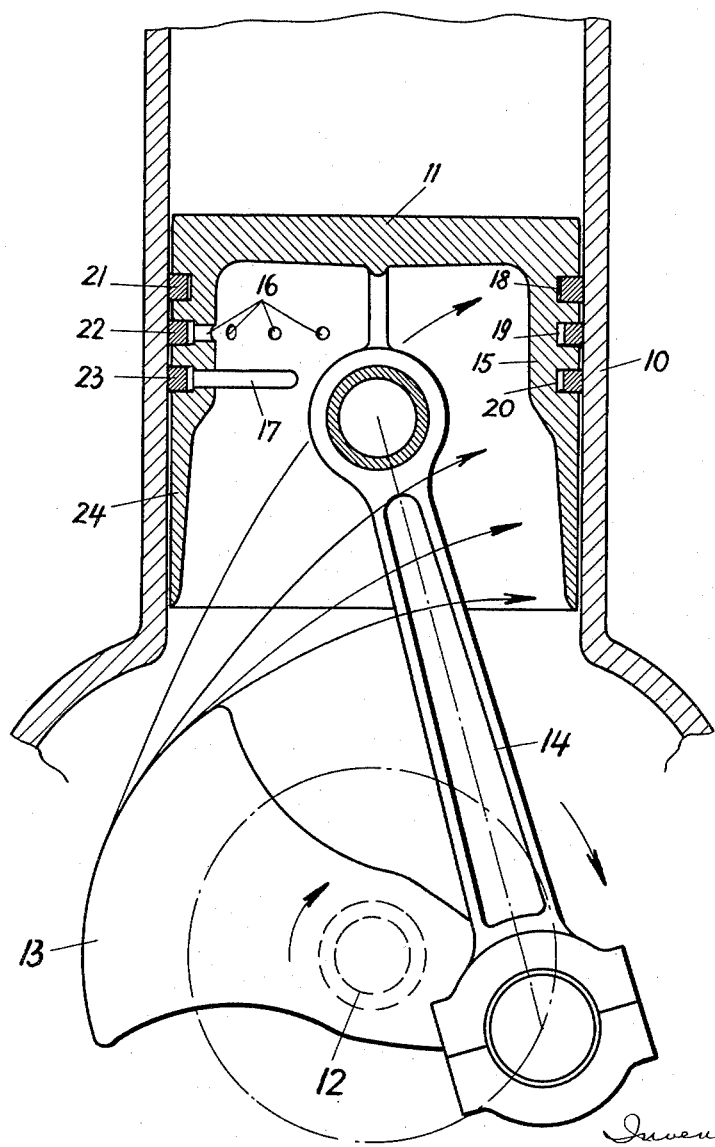

2,753,231

RECIPROCATING INTERNAL COMBUSTION ENGINE AND PISTONS

Friedrich K. H. Nallinger, Stuttgart, Germany, assignor to Daimler-Benz Aktiengesellschaft, Stuttgart-Unterturkheim, Germany Application June 26, 1952, Serial No. 295,793

14 Claims. (Cl. 309—3)

The present invention relates to a reciprocating internal combustion engine and to a construction of the pistons suited for the same.

It is an object of the present invention to provide such a construction of the piston as to avoid an excessive wetting with splash oil of its sliding surface, or of the cylinder bore.

It is another object of the present invention to attain this above-mentioned aim by means of a particular arrangement of oil return passages passing through the sliding side of the piston skirt. The purpose of such oil-return passages is first of all to strip off the oil thrown off the crankshaft, the connecting rod big end bearing, and particularly off the counterweight against the cylinder bore, and to carry it off by way of the interior of the piston skirt e. g. when the piston moves downwardly from the top dead center to the bottom dead center.

The invention is based on the idea that in this case only one side of the cylinder bore is hit, viz. the side of the piston which lies in the direction of the oil tangentially thrown off the crankshaft, whereas the opposite side of the cylinder bore, i. e. the side which must take up the main pressure in the power stroke of the engine, is protected by the projecting edge of the cylinder against splash oil from the crankcase.

This different effect on the opposite sides of the cylinder bores or of the piston skirt, is distinctly marked in the case of a short-stroke engine whose bore is relatively wide in proportion to the stroke. Thus the angle, within which during one revolution of the crankshaft the oil is thrown off into the cylinder bore, becomes wider with short-stroke engines since usually the opening of the cylinder approaches more closely the crankshaft center axis. This impairment occurs particularly when the ratio of stroke:bore is about as much as 1:2 or less.

On account of the short stroke of the engine and the usually high speeds of such engines, big counterweights are generally also provided which pass close by the cylinder openings, and, therefore, oil will be splashed in an increased quantity into the cylinder bore.

An investigation of such a short stroke engine shows, however, that the oil, when thrown off, particularly off the counterweights, into the interior of the cylinders does not hit mainly the cylinder bore itself, but at best only a small portion of the oil thrown off hits the interior of the cylinder, while it hits principally the interior of the piston which is near the bottom dead center with the counterweight in such position. Thus the purpose of the oil-return passages, for instance slots and holes, which should carry the oil off the outside of the piston into the interior of the piston skirt is, on the contrary, reversed, that is to say: the oil thrown off the counterweight and the other crankshaft parts into the interior of the piston will run from there into the cylinder bore and thus will pass on to the combustion chamber.

In order to eliminate this disadvantage, there are, according to a feature of the present invention no oil-return slots or holes arranged on the side of the piston which is exposed to the oil thrown off the crankshaft and the counterweight tangentially, so that such openings are dispensed with on this side of the piston. Further objects and advantages obvious from the following description when taken in connection with the accompanying drawing which shows in its single view for purposes of illustration only a cross sectional view of one preferred embodiment of the present invention.

Referring now more particularly to the single view of the drawing, reference numeral 10 designates the engine cylinder, 11 the working piston, 12 the crankshaft, 13 the counterweight of the crankshaft, and 14 the connecting rod between the piston and the crankshaft.

In the drawing the engine is shown as seen in the direction from the front toward the rear thereof against the output end. The crankshaft turns clockwise as indicated by the arrow. The oil is thrown off the counterweight 13 to the side 15 of the piston. In order to prevent oil from flowing outwardly through the usual return openings provided on that side of the piston and from getting into the combustion chamber, no openings are provided on that side, whereas openings 16 or slots 17 are provided for a return flow of the oil. These openings or slots 16 and 17, respectively, start from the middle, or lower ones of the three piston ring grooves 18, 19, 20 provided with the piston rings 21, 22, 23, and pass through the wall 24 on that side of the piston which is exposed to the pressure during the power stroke of the engine.

The oil stripped or wiped off the cylinder bores by the piston rings may run into the ring grooves, for instance, behind the piston rings around about the bottom of the ring grooves, and then be carried off through the appropriately proportioned oil returning slots 17, or holes 16 shown on the left side of the drawing. The oil return-openings may be arranged along a circumference of the piston extending over an angle of 120° to 270°, preferably 180° to 230°, whereas about 90° to 180°, for instance, may be without oil returning openings.

The piston ring grooves 19 and 20 which contain the oil return passages 16 and 17 may be so dimensioned that the play in the radial direction between the corresponding piston rings 22 and 23 and the piston ring grooves 19 and 20 is greater than the corresponding play in a piston ring groove 18 without oil return passages.

In the description and in the claims the terms "at the top" and "at the bottom" refer to engines with upright cylinders and are correspondingly applied to other engines.

The invention is not restricted to the illustrated example of construction, but may be varied at will in the scope of the various ideas of invention.

What I claim is:

1. In an internal combustion engine a crankshaft with an output end, a cylinder, a piston reciprocating in the same, a connecting rod between the piston and the crankshaft, at least one piston ring groove in said piston, a piston ring in said piston ring groove, and oil-return passages connecting the piston ring groove with the hollow interior of the piston, and substantially extending only over that part of the circumference of said piston which corresponds to the side approached first by said crankshaft during rotation thereof.

2. In an internal combustion engine including a crankshaft normally turning in one direction of rotation, a cylinder, a piston reciprocating in the same, a connecting rod between the piston and the crankshaft, at least one piston ring groove in the piston with a piston ring in said piston ring groove, and oil-return passages connecting the piston ring groove with the hollow interior of the piston, and substantially extending only over that part of the circumference of the piston which is more heavily loaded when the piston is moving down during the power stroke of the engine.

3. In an internal combustion engine the combination according to claim 2, in which the oil returning passages extend over an angle of about between 120° and 270° of the circumference of piston.

4. In an internal combustion engine the combination according to claim 2, in which the piston ring groove communicating with the oil returning passages and the piston ring in said piston ring groove are so dimensioned that the play in the radial direction between said piston ring and said piston ring groove is greater than the corresponding play in a piston ring groove without oil returning passages.

5. In an internal combustion engine a crankshaft normally turning in one direction of rotation, a cylinder, a piston reciprocating in the same, a connecting rod between the piston and the crankshaft, oil-return passages in the piston extending through its sliding walls and discharging into the hollow interior of the piston, and substantially extending only over that part of the circumference of piston which is more heavily loaded when the piston is moving down during the power stroke of the engine.

6. In an internal combustion engine according to claim 5, in which the oil-return passages extend over an angle about between 120° and 270° of the circumference of piston.

7. In an internal combustion engine the combination according to claim 5, in which the crankshaft and the cylinder are so dimensioned that the stroke in the cylinder is not greater than 1.2 times the bore of the cylinder.

8. In an internal combustion engine the combination according to claim 5, in which the crankshaft and the cylinder are so dimensioned that the stroke in the cylinder is not greater than the bore of the same.

9. In an internal combustion engine the combination according to claim 5, in which the oil-return passages are formed by slot-like openings extending in the direction of the circumference.

10. In an internal combustion engine a crankshaft normally turning in one direction of rotation, a cylinder, a piston reciprocating in it, a connecting rod between the piston and the crankshaft, several piston ring grooves in the piston with piston rings in them, and oil-return passages in at least two piston ring grooves establishing a communication between said last-mentioned grooves and the hollow interior of the piston and substantially extending only over that part of the circumference of the piston which is more heavily loaded when the piston is moving down during the power stroke of the engine.

11. A piston comprising a piston head, a substantially cylindrical sliding wall, at least one piston ring groove, and oil-return passages running through the sliding wall between the piston ring groove and the hollow interior of the piston, and extending only over a part of the circumference of said piston corresponding to the high pressure side of said piston.

12. A piston according to claim 11, in which the oil returning openings extend only over an angle of the circumference of the piston above 120° and below 270°.

13. A piston according to claim 10, in which the oil returning passages provided in an upper piston ring groove consist of separate holes and the oil-return passages provided in a bottom piston ring groove of slot-like openings extending in the direction of the circumference.

14. In an internal combustion engine, a crank shaft normally turning in one direction of rotation, a cylinder having a substantially vertical axis, a piston reciprocating in said cylinder, a connecting rod between said piston and said crank shaft, a counterweight connected to said crank shaft on the side thereof opposite to the connection of said connecting rod with said crank shaft, oil-return passages in said piston passing through its sliding walls and discharging into the hollow interior of said piston, said oil-return passages extending only over that part of the circumference of said piston which is more heavily loaded when the piston moves downwardly during the power stroke of the engine.

References Cited in the file of this patent

UNITED STATES PATENTS

| | | |
|---|---|---|
| 1,546,401 | Panyard | July 21, 1925 |
| 1,712,591 | Taylor | May 14, 1929 |
| 1,733,618 | Moore | Oct. 29, 1929 |
| 1,977,910 | Grover | Oct. 23, 1934 |
| 1,996,147 | Cromis | Apr. 2, 1935 |
| 2,244,166 | Marien | June 3, 1941 |
| 2,293,682 | Engelhardt | Aug. 18, 1942 |

FOREIGN PATENTS

| | | |
|---|---|---|
| 224,995 | Great Britain | Nov. 27, 1924 |
| 578,467 | Great Britain | June 28, 1946 |